UNITED STATES PATENT OFFICE.

ERNST PREISWERK AND WALTER BERNOULLI, OF BASEL, SWITZERLAND, ASSIGNORS TO SOCIETY OF CHEMICAL INDUSTRY IN BASLE, OF BASEL, SWITZERLAND.

AMIDS OF THE ARYLALKYLOXYACETIC ACIDS AND PROCESS OF MAKING SAME.

1,061,120.      Specification of Letters Patent.      Patented May 6, 1913.

No Drawing.      Application filed October 24, 1912. Serial No. 727,594.

*To all whom it may concern:*

Be it known that we, ERNST PREISWERK, doctor of philosophy and chemist, and WALTER BERNOULLI, doctor of philosophy and chemist, both citizens of the Swiss Republic, and residents of Basel, Switzerland, have invented new and useful Amids of the Arylalkyloxyacetic Acids and a Process of Making Same, of which the following is a full, clear, and exact specification.

We have found that the till now unknown amids of the arylalkyloxyacetic acids, corresponding to the general formula

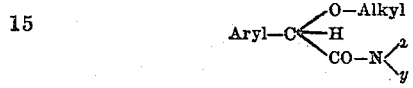

(wherein $x$ and $y$ stand for hydrogen or alkyl), have besides of a very small poisonous action valuable hypnotic and sedative properties. As these properties of the said compounds are considerably reinforced comparatively to the corresponding derivatives of phenylglycolic acid, an essential influence is attributed to the presence of the alkyloxy group.

The new compounds are difficultly soluble in water, ligroin and petroleum ether and easily soluble in alcohol and benzene. They are prepared by treating the esters of arylalkyloxyacetic acids of the general formula

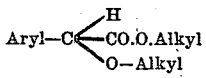

with a basic compound having the radical —NH$_2$, as for instance ammonia and primary or secondary amins.

The esters employed as parent material may be prepared by the action of sodium alcoholates on the esters of arylchloroacetic acids (Comp. R. Meyer and H. Bonder, *Liebigs Annalen* 220 pag. 44/45) or by treating the corresponding derivatives of phenylglycolic acid with alkylhaloides in presence of silver oxid (Comp. McKennie, *Journal of the Chemical Society of London*, 75, pag. 755 and fol.).

Example I: 1 part of ethylester of phenylethoxyacetic acid (boiling at 145 to 147° C. under a pressure of 20 millimeters) is agitated with 10 parts of a saturated aqueous solution of ammonia for several hours at ordinary temperature. By evaporation of the ammonia, the phenylethoxyacetamid

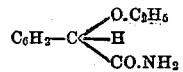

separates from the liquid in the form of colorless needles. This amid is easily soluble in alcohol and benzene, somewhat less soluble in ether and more difficultly soluble in ligroin, petroleum-ether and water.

In an analogous manner can be prepared (1) from the ethylester of phenylmethoxyacetic acid (boiling at 148 to 151° C. under a pressure of 22 millimeters) the phenylmethoxyacetamid melting at 110 to 111° C.; (2) from the ethylester of paratolylethoxyacetic acid (boiling at 160 to 165° C. under a pressure of 22 millimeters) the paratolylethoxyacetamid melting at 130 to 131° C.; (3) from the ethylester of phenylallyloxyacetic acid (boiling at 163 to 164° C. under a pressure of 24 millimeters) the phenylallyloxyacetamid melting at 77 to 78° C.

Example II: To 1 part of ethylester of phenylpropyloxyacetic acid (boiling at 149 to 151° C. under a pressure of 16 millimeters) is added the quantity of an aqueous solution of monoethylamin of 70 per cent. necessary to form a clear solution. The mass is left to stand for a day and distilled *in vacuo*. Under a pressure of 16 to 17 millimeters a liquid boiling at 181 to 189° C. is distilled off, which becomes quickly solid. From petroleum ether crystallizes the phenyloxypropolyl acetmonoethylamid.

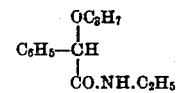

in the form of colorless needles melting at 51° C. It dissolves easily in alcohol and benzene, more difficultly in petroleum ether and ligroin and very difficultly in water.

What we claim is:

1. The herein described process for the manufacture of amids of the arylalkyloxyacetic acids consisting in treating the ester of the formula.

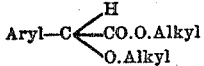

with a basic compound having the radical $-NH_2$.

2. The herein described process for the manufacture of amids of the phenylalkyloxyacetic acids, consisting in treating the ester of the formula

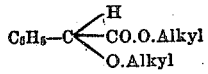

with a basic compound having the radical $-NH_2$.

3. The herein described process for the manufacture of amids of the arylalkyloxyacetic acids consisting in treating the ester of the formula

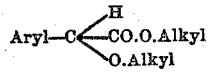

with ammonia.

4. The herein described process for the manufacture of amids of the phenylalkyloxyacetic acids, consisting in treating the ester of the formula

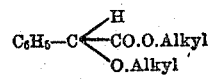

with ammonia.

5. The herein described process for the manufacture of phenylethoxyacetamid consisting in treating the ethylester of phenylethoxyacetic acid

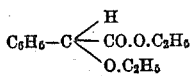

with ammonia.

6. As new products the described amids of the arylalkyloxyacetic acids, corresponding to the formula

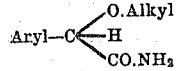

having hypnotic and sedative properties, difficultly soluble in water, petroleum ether and ligroin and easily soluble in alcohol and benzene.

7. As a new article of manufacture, the described phenylethoxyacetamid corresponding to the formula

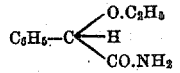

crystallizing from water in colorless needles melting at 90° C., easily soluble in alcohol and benzene, difficultly soluble in petroleum ether, ligroin and water and having valuable hypnotic and sedative properties.

In witness whereof we have hereunto signed our names this 12 day of October 1912, in the presence of two subscribing witnesses.

ERNST PREISWERK.
WALTER BERNOULLI.

Witnesses:
GEO. GIFFORD,
AMAND BRAUN.